US012217602B2

(12) United States Patent
Robinson

(10) Patent No.: US 12,217,602 B2
(45) Date of Patent: Feb. 4, 2025

(54) SYSTEMS AND METHODS INVOLVING FEATURES OF ADAPTIVE AND/OR AUTONOMOUS TRAFFIC CONTROL

(71) Applicant: Fastec International, LLC, Hinsdale, IL (US)

(72) Inventor: Kurt B. Robinson, Newcastle, CA (US)

(73) Assignee: FASTec International, LLC, Hinsdale, IL (US)

( * ) Notice: Subject to any disclaimer, the term of this patent is extended or adjusted under 35 U.S.C. 154(b) by 94 days.

(21) Appl. No.: 16/916,882

(22) Filed: Jun. 30, 2020

(65) Prior Publication Data

US 2020/0402392 A1    Dec. 24, 2020

Related U.S. Application Data

(63) Continuation of application No. 15/700,876, filed on Sep. 11, 2017, now Pat. No. 10,699,561, which is a
(Continued)

(51) Int. Cl.
*G08G 1/01* (2006.01)
*G06V 20/54* (2022.01)
*G08G 1/042* (2006.01)

(52) U.S. Cl.
CPC .......... *G08G 1/0116* (2013.01); *G06V 20/54* (2022.01); *G08G 1/0145* (2013.01); *G08G 1/042* (2013.01)

(58) Field of Classification Search
CPC .... G08G 1/0116; G08G 1/0145; G08G 1/042; G06V 20/54
See application file for complete search history.

(56) References Cited

U.S. PATENT DOCUMENTS 5,448,484 A * 9/1995 Bullock ............... G06V 10/454
340/933
5,459,665 A * 10/1995 Hikita ................ B66B 1/2408
706/910

(Continued)

FOREIGN PATENT DOCUMENTS

CN    101739828    6/2010
CN    101847320    9/2010
(Continued)

OTHER PUBLICATIONS

Chinese Office Action, dated Sep. 23, 2019, from corresponding Chinese Patent Application No. 201480082536.0.

*Primary Examiner* — Rami Khatib
(74) *Attorney, Agent, or Firm* — Greenberg Traurig, LLP

(57) ABSTRACT

Systems and method are disclosed for adaptive and/or autonomous traffic control. In one illustrative implementation, there is provided a method for processing traffic information. Moreover, the method may include receiving data regarding travel of vehicles associated with an intersection, using neural network technology to recognize types and/or states of traffic, and using the neural network technology to process/determine/memorize optimal traffic flow decisions as a function of experience information. Exemplary implementations may also include using the neural network technology to achieve efficient traffic flow via recognition of the optimal traffic flow decisions.

23 Claims, 11 Drawing Sheets

System Block Diagram

Related U.S. Application Data continuation of application No. 14/474,232, filed on Sep. 1, 2014, now Pat. No. 9,761,131, which is a continuation of application No. PCT/US2014/049839, filed on Aug. 6, 2014, which is a continuation of application No. 13/369,233, filed on Feb. 8, 2012, now Pat. No. 8,825,350.

(60) Provisional application No. 61/562,607, filed on Nov. 22, 2011.

(56) References Cited

U.S. PATENT DOCUMENTS

| | | | | |
|---|---|---|---|---|
| 5,668,717 | A * | 9/1997 | Spall | G08G 1/081 |
| | | | | 706/903 |
| 5,949,367 | A * | 9/1999 | Trompf | G01S 7/417 |
| | | | | 700/48 |
| 6,418,371 | B1 | 7/2002 | Arnold | |
| 6,760,061 | B1 * | 7/2004 | Glier | G08G 1/164 |
| | | | | 382/104 |
| 2002/0054210 | A1 * | 5/2002 | Glier | G08G 1/164 |
| | | | | 348/E7.087 |
| 2002/0186660 | A1 * | 12/2002 | Bahadiroglu | H04L 29/06 |
| | | | | 370/468 |
| 2008/0094250 | A1 * | 4/2008 | Myr | G08G 1/081 |
| | | | | 340/909 |
| 2009/0048750 | A1 | 2/2009 | Breed | |
| 2010/0262901 | A1 * | 10/2010 | DiSalvo | G06Q 40/04 |
| | | | | 715/777 |
| 2011/0043378 | A1 | 2/2011 | Bailey et al. | |
| 2011/0205086 | A1 * | 8/2011 | Lamprecht | G08G 1/08 |
| | | | | 340/928 |
| 2018/0096595 | A1 * | 4/2018 | Janzen | G08G 1/04 |
| 2018/0190111 | A1 * | 7/2018 | Green | G06V 20/52 |

FOREIGN PATENT DOCUMENTS

| | | |
|---|---|---|
| CN | 101981605 | 2/2011 |
| CN | 102124505 | 7/2011 |
| CN | 102306452 | 1/2012 |
| CN | 103077617 | 5/2013 |
| CN | 103136938 | 6/2013 |
| CN | 103236162 | 8/2013 |
| CN | 103383817 | 11/2013 |
| CN | 103646555 | 3/2014 |

* cited by examiner

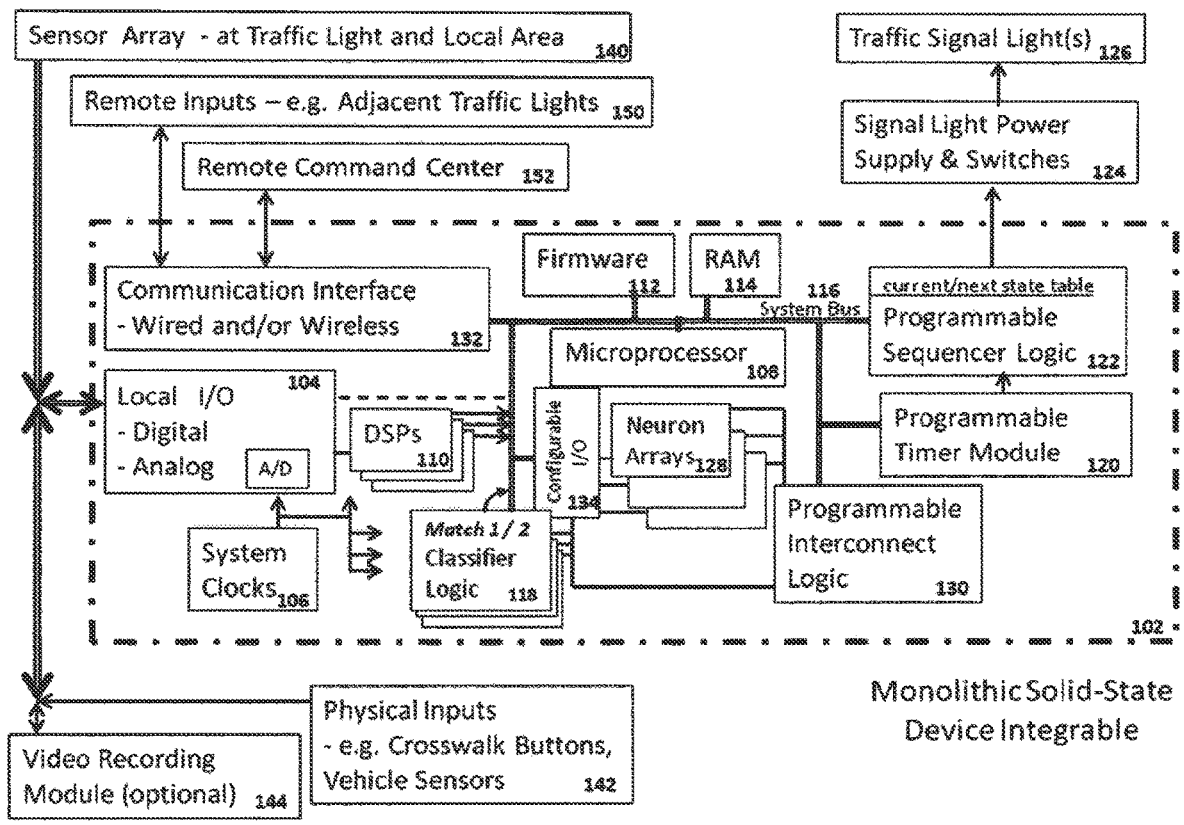
Figure 1. System Block Diagram

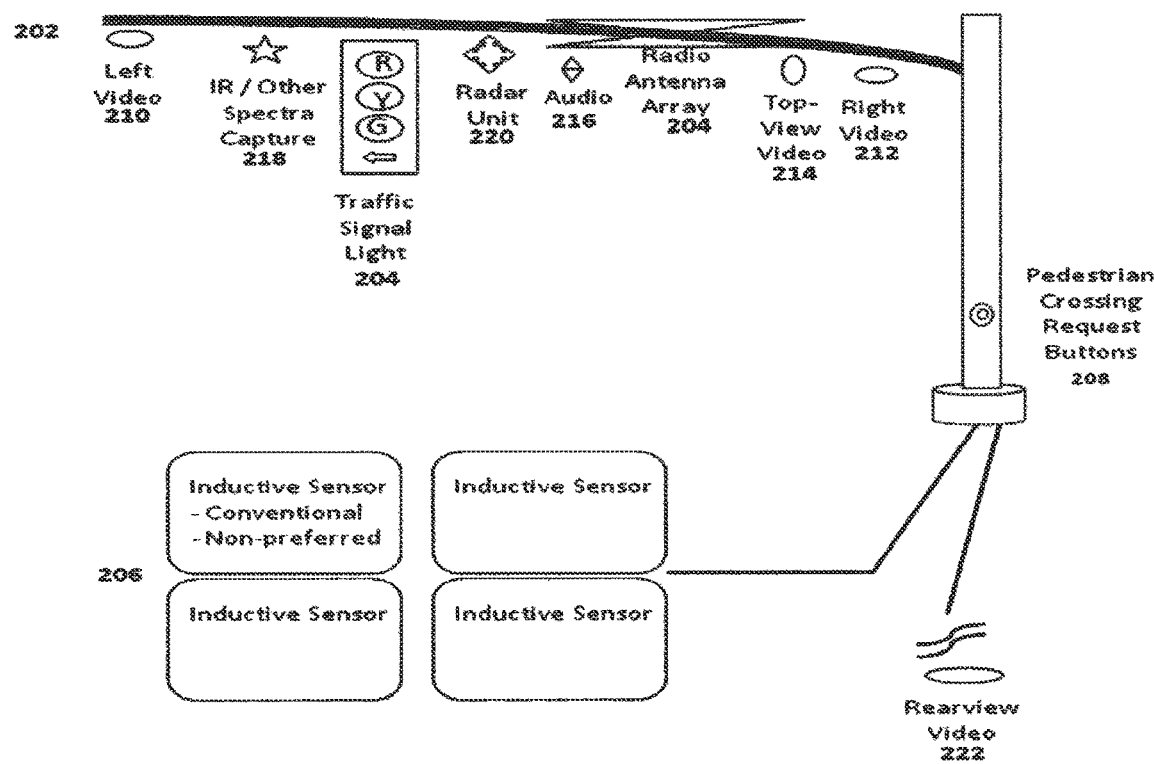
Figure 2. Example Sensor Array: intersection-entrance-specific

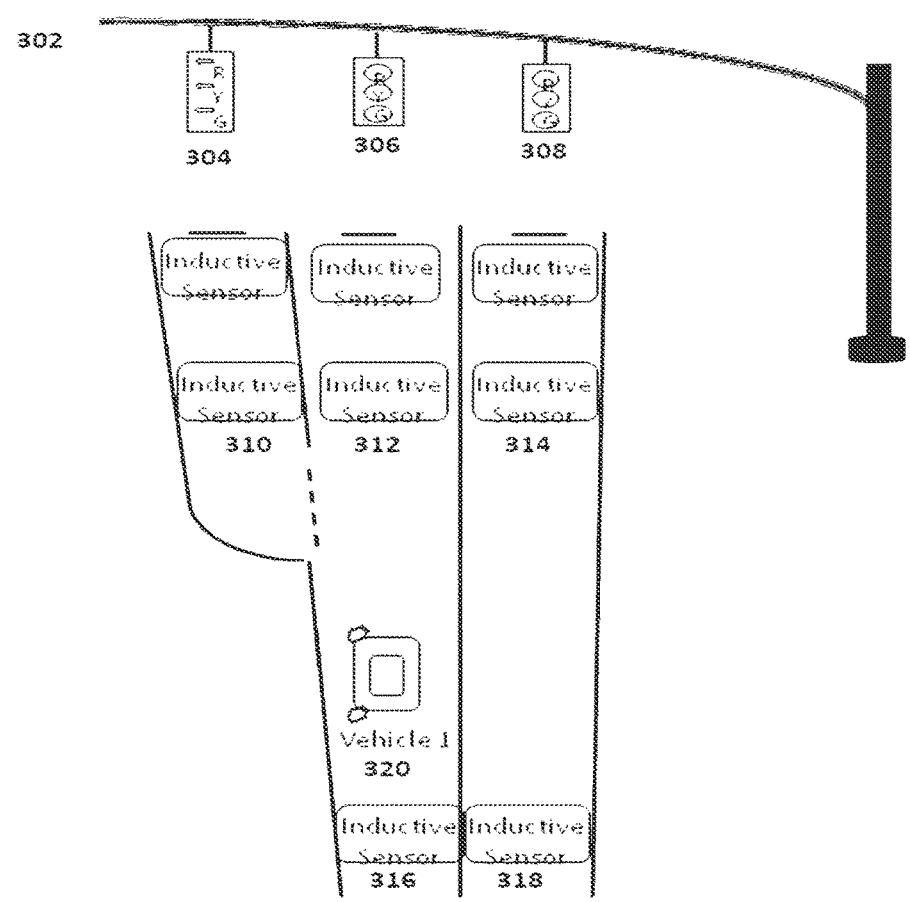
Figure 3. Typical Conventional Sensor Configuration

Example State Table Sequence – Case 1: Independent, Demand-Based Left Turn Goes First States / Time Progression →    1 = ON

| | Signal | "All Stop" #1 | #2 | #3 | #4 | #5 | #6 | #7 | #8 | #9 | "All Stop" #10 | #11 |
|---|---|---|---|---|---|---|---|---|---|---|---|---|
| MAIN STRAIGHT | Red | 1 | 1 | 1 | 1 | 1 | 1 | 1 | | | 1 | 1 |
| | Yellow | | | | | | | | | 1 | | |
| | Green | | | | | | | | 1 | | | |
| MAIN LT.TURN | Red-LT | 1 | | | 1 | 1 | 1 | 1 | 1 | 1 | 1 | 1 |
| | Yel-LT | | | 1 | | | | | | | | |
| | Grn-LT | | 1 | | | | | | | | | |
| OPP. STRAIGHT | Red | 1 | 1 | 1 | 1 | | | | | | 1 | 1 |
| | Yellow | | | | | | | | | 1 | | |
| | Green | | | | | 1 | 1 | 1 | 1 | | | |
| OPP. LT.TURN | Red-LT | 1 | | | | | | | 1 | 1 | 1 | 1 |
| | Yel-LT | | | | | | | 1 | | | | |
| | Grn-LT | | 1 | 1 | 1 | 1 | 1 | | | | | |
| ADJ. STRAIGHT | Red | 1 | 1 | 1 | 1 | 1 | 1 | 1 | 1 | 1 | 1 | 1 |
| | Yellow | | | | | | | | | | | |
| | Green | | | | | | | | | | | |
| ADJ. LT.TURN | Red-LT | 1 | 1 | 1 | 1 | 1 | 1 | 1 | 1 | 1 | 1 | |
| | Yel-LT | | | | | | | | | | | |
| | Grn-LT | | | | | | | | | | | 1 |

Figure 4. Control Signal Light Sequence - Example 1

Example State Table Sequence – Case 2: Alternating Opposite Sides Straight and Left States / Time Progression →    1 = ON, ** = Flashing

| | Signal | "All Stop" #1 | #2 | #3 | #4 | #5 | #6 | #7 | #8 | #9 | #10 | #11 | "All Stop" #12 | #13 |
|---|---|---|---|---|---|---|---|---|---|---|---|---|---|---|
| MAIN STRAIGHT | Red | 1 | | | | | | | | 1 | 1 | 1 | 1 | 1 |
| | Yellow | | | | | | | | 1 | | | | | |
| | Green | | 1 | 1 | 1 | 1 | 1 | ** | | | | | | |
| MAIN LT TURN | Red-LT | 1 | | | | 1 | 1 | 1 | 1 | 1 | 1 | 1 | 1 | 1 |
| | Yel-LT | | | | 1 | | | | | | | | | |
| | Grn-LT | | 1 | ** | | | | | | | | | | |
| OPP. STRAIGHT | Red | 1 | 1 | 1 | 1 | 1 | | | | | | | 1 | 1 |
| | Yellow | | | | | | | | | | | 1 | | |
| | Green | | | | | | 1 | 1 | 1 | 1 | 1 | | | |
| OPP. LT TURN | Red-LT | 1 | 1 | 1 | 1 | 1 | 1 | 1 | 1 | 1 | | | 1 | 1 |
| | Yel-LT | | | | | | | | | | 1 | | | |
| | Grn-LT | | | | | | | | | | | 1 | | |
| ADJ. STRAIGHT | Red | 1 | 1 | 1 | 1 | 1 | 1 | 1 | 1 | 1 | 1 | 1 | 1 | |
| | Yellow | | | | | | | | | | | | | |
| | Green | | | | | | | | | | | | | 1 |
| ADJ LT TURN | Red-LT | 1 | 1 | 1 | 1 | 1 | 1 | 1 | 1 | 1 | 1 | 1 | 1 | |
| | Yel-LT | | | | | | | | | | | | | |
| | Grn-LT | | | | | | | | | | | | | 1 |

Figure 5. Control Signal Light Sequence - Example 2

| Layer 1 | • Detailed Car Classification – Classes & Types<br>• Detailed Heavy Utility Vehicle Classification (e.g. GVWR)<br>• Detailed Motorcycle Classification<br>• Detailed Bicycle / Bicycle Group Classification<br>• Multi-Occupant States of Incoming Vehicles<br>• Distance Classification for all Traffic Object Classes & Types<br>• Detailed Pedestrian / Pedestrian Group Classification & Location<br>• Priority ERV/HOV Special Signal Recognition<br>• Recognition of Driver Intentions (Turn Signals) |
|---|---|
| Layer 2 | • Group / Platoon Size & Distance Recognition<br>• Detection of Groups Sizes, Composition, & Location from Nearby Peer Traffic Signal Controllers<br>• Traffic Object & Pedestrian Speeds<br>• Individual Traffic Object Wait Times<br>• Individual Traffic Object Average Speed |
| Layer 3 | • Average Speeds of Multiple Objects & Incoming Groups<br>• Aggregate Wait Times of Stopped Traffic<br>• Cumulative Passenger Occupation of Incoming Vehicles<br>• Central Network-Wide Priority Inputs |
| Layer 4 | • Light Sequence Selection Decisions<br>• Timing Alteration Decisions |

Figure 6. Example Training Algorithm Inputs

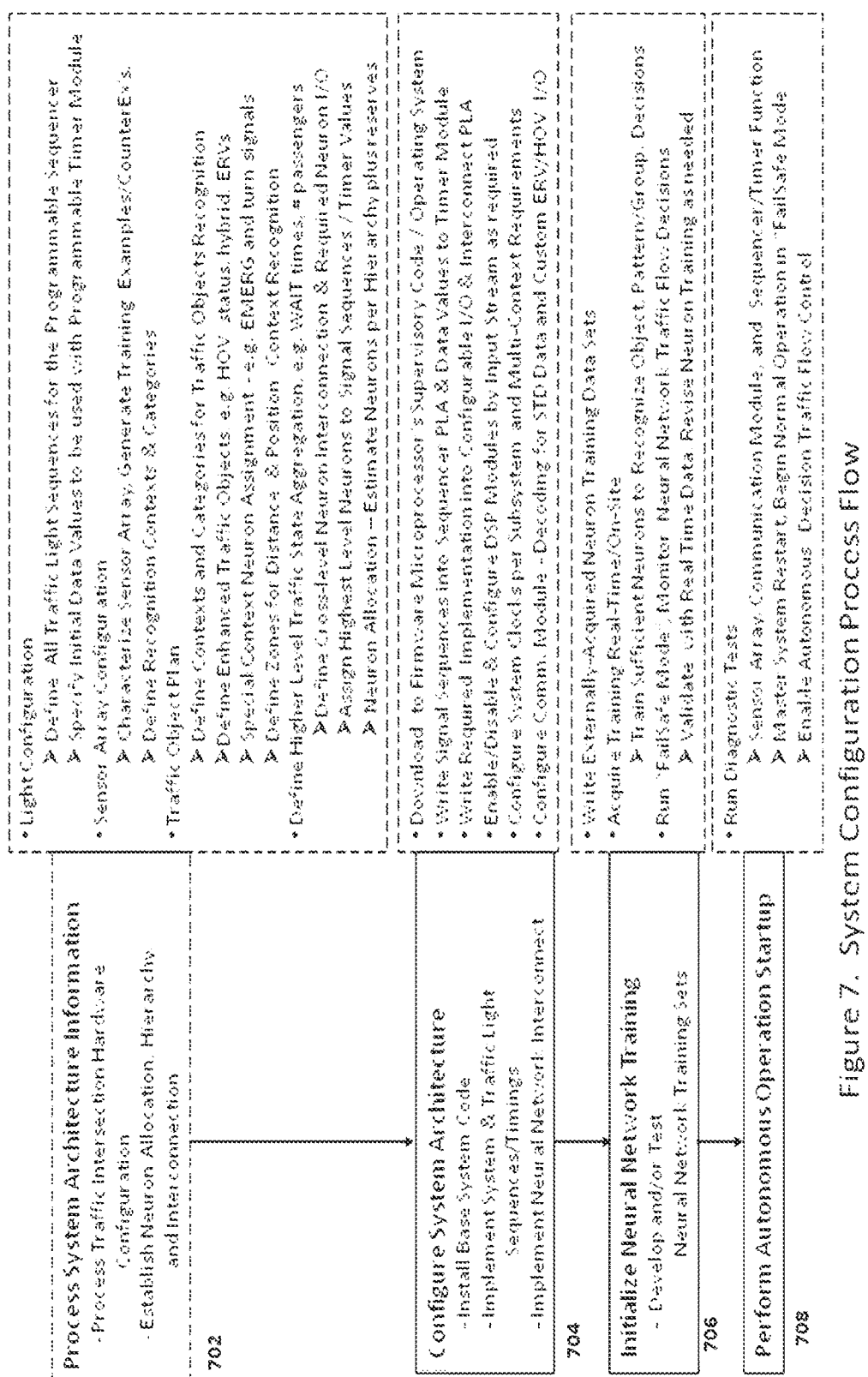
Figure 7. System Configuration Process Flow

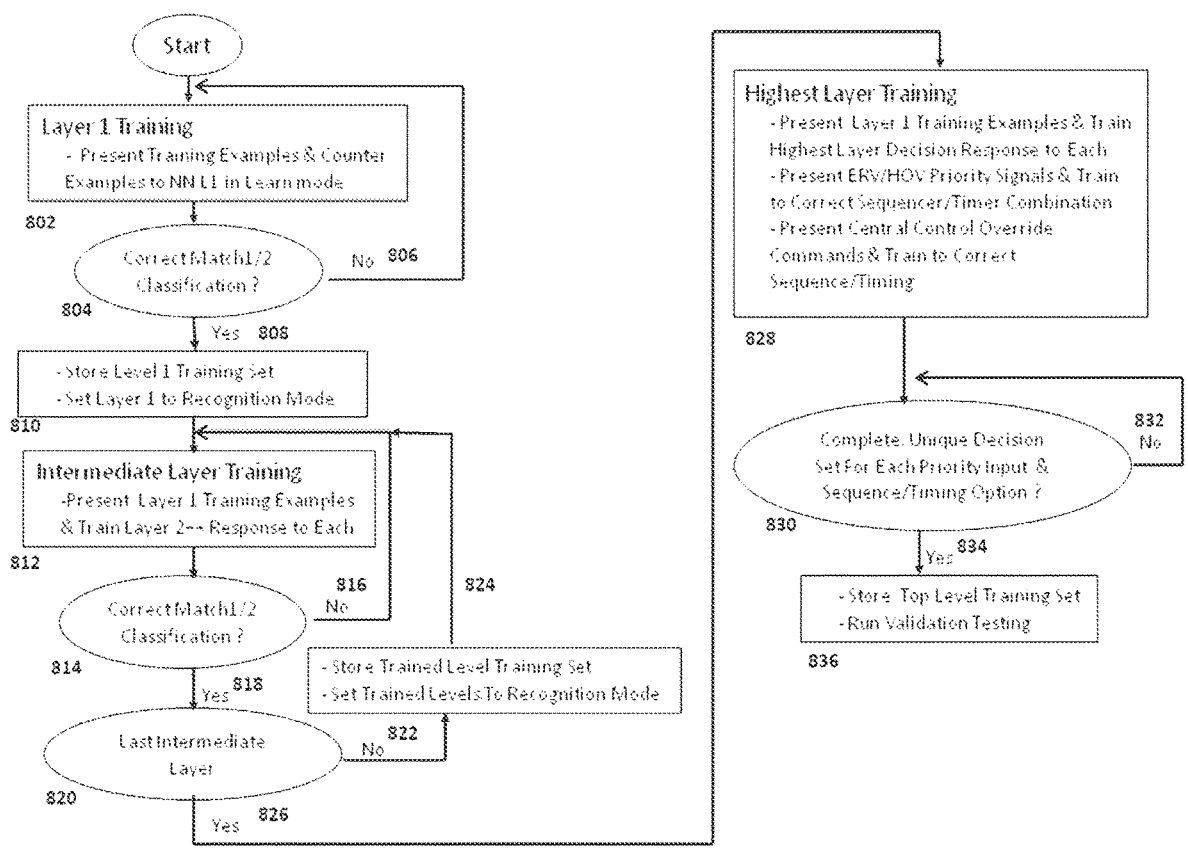
Figure 8. Neural Network Training Flow

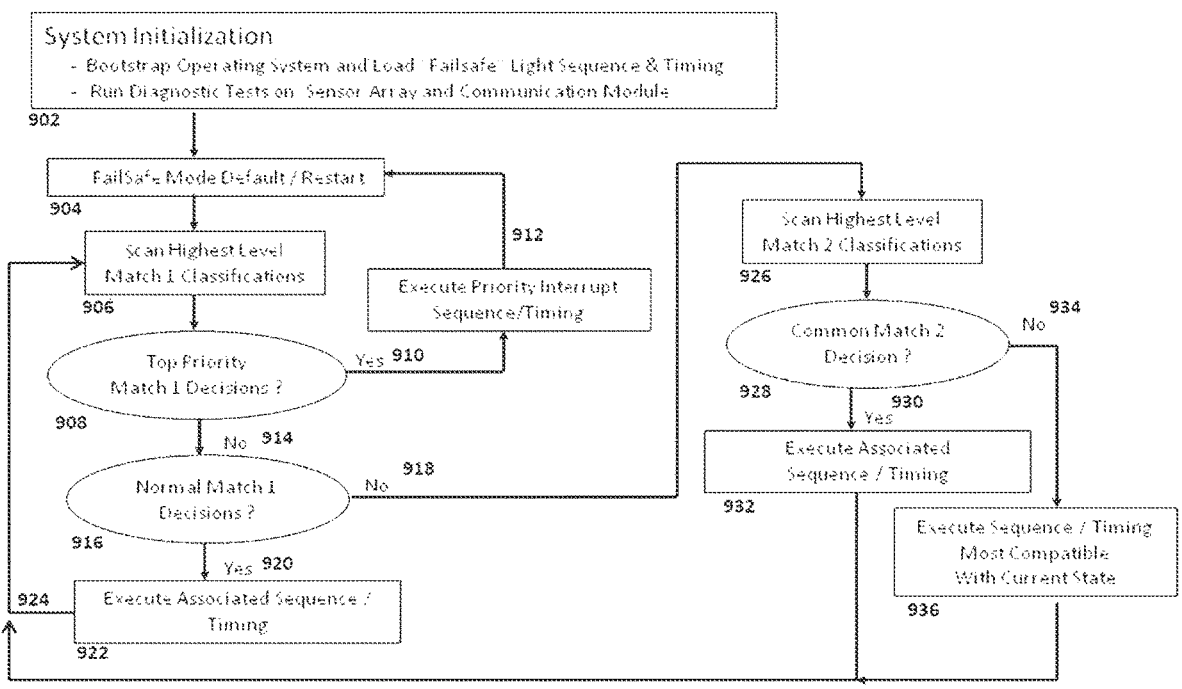
Figure 9. System Startup and Run-Time Flowchart

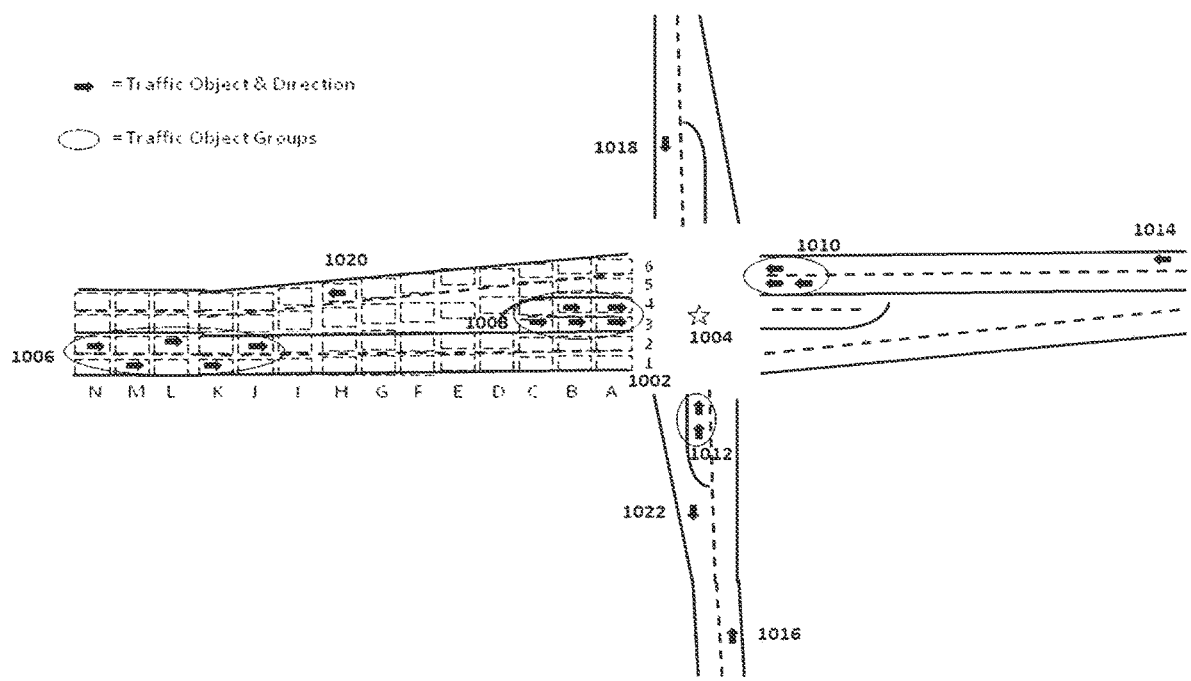
Figure 10A. Upper-Level Neural Network Recognition Reference

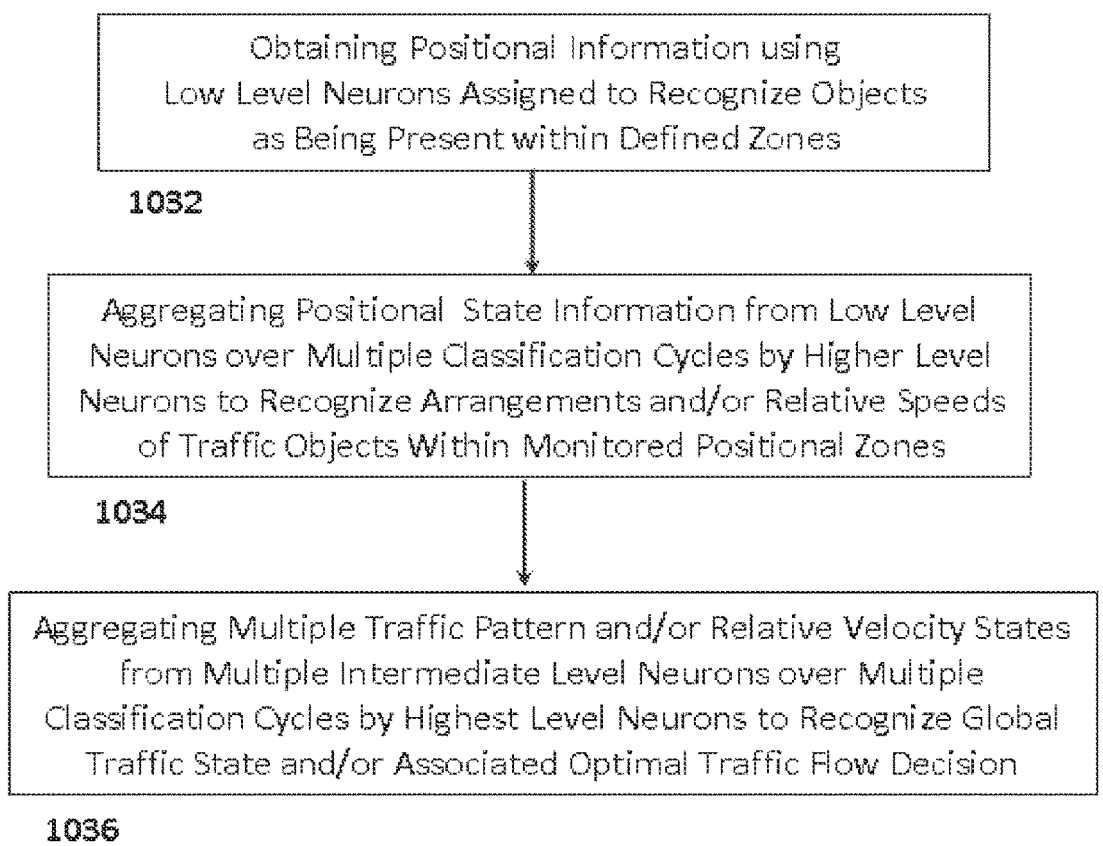
Figure 10B. Basic Flow for Global Context Aggregation

SYSTEMS AND METHODS INVOLVING FEATURES OF ADAPTIVE AND/OR AUTONOMOUS TRAFFIC CONTROL

CROSS REFERENCE TO RELATED APPLICATIONS

This is a continuation of application Ser. No. 15/700,876, filed Sep. 11, 2017, now U.S. Pat. No. 10,699,561, which is a continuation of application Ser. No. 14/474,232, filed Sep. 1, 2014, now U.S. Pat. No. 9,761,131, which is a continuation of application Ser. No. 13/369,233, filed Feb. 8, 2012, now U.S. Pat. No. 8,825,350, which claims benefit/priority of provisional application No. 61/562,607, filed Nov. 22, 2011, and further application Ser. No. 14/474,232 is also a continuation (bypass) of PCT application No. PCT/US14/49839, filed Aug. 6, 2014, all of which are incorporated herein by reference in entirety.

BACKGROUND

Field

The present innovations relate generally to traffic control, and, more, specifically, to systems and method involving adaptive and/or autonomous traffic control.

Description of Related Information

Neural network technologies have been in development for decades where real-time computing problems are solved by using software or circuitry which emulates the brain's function. The human brain contains roughly 100 billion neurons. About 300 million neurons are dedicated to the visual cortex, just one of several sensory input sources to the brain. Small to medium scale artificial intelligence systems using neural network technology have been used successfully in many real-world applications such as pattern recognition for industrial process sorting or quality control functions and real-time navigation and collision avoidance systems, with results meeting or exceeding human capabilities. For example, challenges sponsored by DARPA have taken place where autonomous vehicles employing neural network technology have successfully navigated across vast distances of hazardous desert terrain or through urban courses.

Human brains and artificial neural networks both store memorized visual images, other sensory input, and related sequences thereof to make real-time predictions, i.e. decisions, from those sensory inputs. As with other well-adapted animal species having brains smaller than those of humans, artificial neural network systems of modest size can perform well on tasks calibrated to the size of "brain". Traffic light controllers perform a critical task in modern society and represent a technical challenge well within capabilities of emerging neural network technology.

Practical solid-state devices currently in production provide economic solutions to many real-world problems. Current and proposed solid-state technologies, such as flash memory and memristor devices, offer very high density analog nonvolatile storage elements well-suited to constructing high-density solid-state analog neural network devices. Typical flash memory arrays of 4 billion transistors or more in size could yield neural network devices with 4 million or more neurons. While the human brain is capable of incredibly complex pattern recognition and prediction, artificial intelligence systems with far fewer neurons can accomplish important real world tasks. Current implementations of solid-state neural network devices have bridged the gap between human and artificial neural network capacities with techniques such as reducing size of input data streams with integrated digital signal processing (DSP) modules.

Artificial analog neural networks have recognition engines typically employ K-Nearest Neighbor (KNN) or radial basis function (RBF) nonlinear classifiers or both. While KNN classification is useful in applications seeking merely the closest match to a recognized pattern, RBF classification is particularly useful in traffic control applications by virtue of its "yes, no, or uncertain" output states. Current solid-state devices, in addition to having such DSP and classification modules, can also be interconnected for scaling to larger, multi-level neural networks. As such, aspects of the present innovations may be implemented with existing technology or with future devices having larger neuron capacity or with future, fully integrated solid-state devices having all the capability herein described.

Certain advantages of the systems and methods herein are obvious to readers having personal experience with automobile travel. Among other things, current vehicle sensors provide inadequate recognition of incoming traffic, forcing traffic to stop before traffic signal light changes are effected. Or, as will be shown, sensors intended to provide advance traffic flow information cannot fully comprehend driver intentions, resulting in incorrect decisions by current traffic light control systems. While hybrid automotive technology improves efficiency by capturing energy otherwise lost when vehicles are stopped, it is even more efficient to regulate traffic flow to maximize overall throughput, minimizing cumulative vehicle wait times. Vehicle wait times equal passenger wait times, such that improved traffic flow yields both improvements in overall fuel economy and increased driver productivity. Innovations herein include systems capable of providing comprehensive traffic control system functionality, such as full implementation of various features and aspects.

Further aspects consistent with the present innovations relate to overall system performance due to real-time, parallel recognition and traffic flow decision selection by the neural network. As with a human observer or traffic officer, a comprehensive overall picture of traffic flow needs yields an immediate decision for optimal traffic flow through an intersection. As such, according to some implementations, intermediate hierarchical layers of the neural network aggregate such an overall picture from which a specific, optimal traffic light sequence is selected. Performance of significantly higher magnitude than existing systems may be achieved via a fully integrated solid-state device implementation of the system, surpassing that of algorithmic implementations using digital processors.

OVERVIEW OF VARIOUS ASPECTS

Aspects of the present innovations may include or involve systems and methods for providing high accuracy recognition of all types of traffic requiring passage through an intersection with means to add and improve recognition of such traffic, to optimize the prioritized flow of traffic through the intersection, and/or to adapt to new traffic types, technologies, priorities, and/or traffic flow needs. In some implementations, neural network arrays may be used to store recognized traffic objects and traffic flow patterns thereof, enabling autonomous traffic flow control by the local traffic light controller without the use of system-wide central synchronization or static, predetermined digital control algorithms.

Drawbacks may be overcome in accordance with aspects the present innovations via provision of improved control systems and methods for traffic lights which makes significantly better decisions regarding the type and intentions of incoming traffic while reducing both initial installation and long-term upgrade costs by means of artificial intelligence in the form of a neural network based controller having real-time adaptive learning ability and upgradability.

Thus, advantages relating to one or more aspects of the present innovations include having real-time adaptive capabilities which enable optimized traffic flow control superior to fixed algorithms of digital control systems.

According to some implementations, further advantages may be achieved via autonomous operation without external human intervention or fixed-timing synchronization with nearby systems.

Advantages related to other implementations include providing superior detection of, signal control for, and, hence, superior traffic flow performance for all types of traffic incoming to the autonomous signal light.

Other further advantages of the present innovations relate to the provision of a design and methodology enabling lowest-cost, high performance reliable, solid state implementations of the capabilities set forth herein.

Still further advantages of systems and method herein are achieved as a function of the size of emerging low-cost neural network arrays absorbing functions of digital logic for improved performance at lowest-cost by eliminating digital component costs and processing delays.

Further aspects of the present innovations may be seen in connection with additional implementations set forth herein and/or provided via the appended specification, drawings and claims.

BRIEF DESCRIPTION OF THE DRAWINGS

The above and other items, features, and advantages of the inventions will be better understood by reading the following more particular description of the innovations in conjunction with the accompanying drawings wherein:

FIG. 1 is a global block diagram of an illustrative system, consistent with one or more aspects of the innovations herein.

FIG. 2 is a diagram illustrating one common traffic light arrangement and a sensor array, consistent with one or more aspects of the innovations herein.

FIG. 3 is a diagram illustrating an existing typical signal light configuration which illustrates some limitations of prior systems.

FIG. 4 is a diagram showing an illustrative traffic signal light sequence reflecting useful functional aspects consistent with one or more aspects of the present innovations.

FIG. 5 is a diagram showing another illustrative traffic signal light sequence reflecting useful functional aspects consistent with one or more aspects of the present innovations.

FIG. 6 is a diagram detailing traffic object classification, traffic type classification, individual and group traffic object current state classification, and broader traffic system network input aggregation, as may be used e.g. in the training algorithms in the present neural network systems consistent with one or more aspects of the present innovations.

FIG. 7 is a flowchart depicting an illustrative process for initial system configuration consistent with one or more aspects of the present innovations.

FIG. 8 is a flowchart depicting an illustrative process flow for neural network array training consistent with one or more aspects of the present innovations.

FIG. 9 is a flowchart depicting startup and ongoing operation aspects of an illustrative system, consistent with one or more aspects of the innovations herein.

FIGS. 10A-10B are a diagram and a flowchart, respectively, of illustrative higher-level recognition processing as performed by a Neural Network, consistent with one or more aspects of the innovations herein.

DETAILED DESCRIPTION OF ILLUSTRATIVE IMPLEMENTATIONS

Reference will now be made in detail to the inventions, examples of which are illustrated in the accompanying drawings. The implementations set forth in the following description do not represent all embodiments consistent with the claimed inventions. Instead, they are merely some examples consistent with certain aspects related to the innovations herein. Wherever possible, the same reference numbers will be used throughout the drawings to refer to the same or like parts.

FIG. 1 shows a system block diagram inclusive of all major functional elements along with primary input sources and state/control output destinations. According to some implementations, the elements encircled by the dashed line 102 represent a full set of components/functionality by which aspects of the present innovations can be implemented in one of several scales of integration. Here, some current technologies may be utilized to achieve multi-chip solid-state implementations, while emerging high-density solid-state neural network devices can yield higher integration levels, all the way to future implementations achievable in monolithic solid-state devices.

Systems herein may be implemented with a local input/output [I/O] module 104 that transmits uni- or bi-directional signal data or control signals to or from local sensors and devices of a traffic control system. Module 104 may include an analog to digital (A/D) converter such that all inputs to the system can be represented as digital values including those from analog sensors. A multiplicity of system clocks 106 may also be included to synchronize system processes. For example, the core processing elements of the microprocessor 108 and digital signal processing [DSP] elements 110 may operate at the highest frequency while the main memory (112, 114) and system data bus cycles 116 may be slower, typically some multiple of those core processor frequencies. In turn, the real-time image capture frequency may generally match that of the neural network recognition engine, or classifier 118, cycle time, lower than that of those previous processes. There may be multiples of this type of clock or they may be gated to specific registers of the local I/O module as a function of the data set or "context" for which a specific set of neurons is trained to recognize. For example, the neural network recognizes traffic from all directions incoming to the intersection, so that different contexts may be used to distinguish among traffic flows, especially in the case where a top view camera provides input vectors for more than one direction. Other contexts may be desired where sensor arrays are unique to different traffic directions. Hence at a typical intersection, the neural network may run 4 recognition cycles, one from each direction, for each data capture cycle of the sensor arrays.

Lastly, some programmable count of system clocks is used to vary the timing of signal light via programmable timer module 120 input to the programmable sequencer logic 122. Additional clock sequences may be used to synchronize I/O with independent external systems such as radio communication with standardized "high priority" signal control protocols for emergency response vehicles [ERVs] or high occupancy vehicles [HOVs]. An external power supply and switching relays 124 directed by the output of the programmable sequencer logic 122 drive the individual lens lights of the traffic signal lights 126

Digital signal processing (DSP) modules 110 may be included, as needed, and may reduce the size of video and other sensory input to match the size of data input to the registers of the neural network array. Digital domain memory may include one or both of reprogrammable non-volatile memory 112, such as flash memory, for firmware storage and dynamic working memory 114, such as static RAM. Firmware may be configured to contain control code for the microprocessor's system supervisory code, training software for optimizing performance of the neural network array, and/or system control data parameters such as data values written into the programmable timer module 120. Classifier logic 118 may be included for the output of the neural network array 128 and, in this application, may be of the radial basis function (RBF) type best suited for traffic object recognition and flow control decision-making. The neural network training process may deploy additional neurons as new training examples are provided, simultaneously adjusting the distance, or "influence field," of objects to be recognized relative to the example such that each neuron recognizes only the specific example for which it is trained. A distance of zero means an exact match between new input data and stored vectors. A selected set of neurons assigned to the same "context" may define a "recognition engine" for a predetermined class of learned objects, patterns, or decisions. Within a given context, training specific to a neuron or a subset of that context's set of neurons are assigned a "category" to differentiate among unique objects, patterns, or decisions within that class. A number of different neurons are trained to produce recognition results which vary with the number of objects to be learned and required accuracy of the recognition results.

In some illustrative implementations, valid RBF classifier outputs may be sorted into 3 categories: "Identified", certain with learned distances, i.e. the neuron's influence field, for one or more neurons all belonging to a specific category, which is designated here as "Match 1"; "Uncertain," a possible match with stored vectors of 2 or more neurons of different categories, designated as "Match 2"; or "Unknown," i.e. an input vector which is unrecognized by all currently trained neurons in that context. Unknown results will also occur when there is no activity in the traffic light area, i.e. when there is nothing to recognize. Match 1 and Match 2 are associated flags which can be used to trigger interrupts or polling routines to the microprocessor to initiate changes in traffic light control sequence or timing. The programmable interconnect logic 130 is used to gate which matches, primarily highest level traffic-optimizing decisions, the microprocessor acts upon.

Neurons can be trained to recognize any vector presented to them. Generally, these vectors are presented to a majority or all the neurons of a hierarchical level simultaneously on the system data bus which is the case in recognizing individual traffic objects Thorn video input. Just as with the human brain, however, other neurons can be trained to recognize sequences. Configurable I/O 134 enables the training of sequences. Classifier logic output from specific neurons may be sampled outputs from various low-level neurons at a programmable rate, i.e. a rate established as a function of one or more system clocks, and may be stored in shift registers in the configurable I/O. As such, a sequence of classifier results from those neurons can be assembled into a vector that may be used as input to neurons in higher layers of the neural network hierarchy. Neuron input vectors may be loaded as a sequence of bytes up to the maximum vector size of the neuron implementation. Certain higher level neurons may be wired via programmable interconnect logic to recognize traffic states from lower level neurons, such as in cases where relative speed or grouping of objects is being recognized. The configurable I/O may include data buffers for such higher level neurons for assembly of output data from multiple lower-level neurons in parallel.

A common method for training neural network arrays is back propagation wherein weightings individual inputs to specific neuron are determined by an iterative process which yields an output for a recognition result or decision, defined by a prototype example of the correct recognition of an object, environmental state, or decision. Training data sets, both valid vectors to be positively recognized and counter examples to be rejected, may be presented to the neural network in the training process, at the end of which an appropriate number of neurons with appropriate influence fields are trained to recognize the objects, patterns, and decisions required by the application. Thus the design and prioritized weighting of the training data sets are critical to system performance.

Both fuzzy logic and neural network based systems have previously been proposed as the decision-making engine for traffic light controllers. Similarly, neural network training algorithms themselves are well documented and therefore not discussed here. However, systems and methods herein include system-level capabilities related to deploying very large neural network arrays. Among other things, systems and method with such large capacity may involve or support one or more of: the training specificity of individual lower-level neurons; additional classes of recognition available to enhance system capabilities using higher-level neural network layers; and/or an architecture supporting the customization, optimization, and low cost upgrade capability of the system. Another significant capability offered by the systems and methods herein is the ability to re-train individual recognition engines in real time with full system functionality by reserving spare neurons for this purpose.

Considerations, features and functionality related to decision-making priority weightings may be salient aspects of the current innovations, as described in part in subsequent drawings and tables. An advantage of the neural network array, according to certain embodiments, is the parallel processing nature such that a particular input vector is processed by all neurons in that hierarchical level simultaneously so that unique recognition results appear within one recognition engine cycle, far faster than otherwise achievable through digital computational methods. Such an immediate recognition by the lowest order elements of the neural network array allows immediate classification of a traffic object type. Similarly, immediate recognition of a traffic flow pattern in a higher level of the neural network array yields recognition of particular traffic situations through aggregation of the current state of traffic objects entering or present within the relevant traffic control range of the specific traffic signal light. Other intermediate levels of neural network array may be trained to recognize unique individual features, grouped traffic objects, and nearby incoming traffic relative to the needs of the local traffic area and any wider central traffic network system. Highest levels of the neural network hierarchy may receive outputs from selected lower-level neurons gated by the programmable interconnect logic 130 which are used to select specific, optimal traffic flow decisions when the appropriately trained neural network generates a match between current conditions with a specific decision. The decision is the firing, or "Match1" classification, of one or more highest level neurons with which a specific programmable sequencer logic subsequence entry point and programmable timer module data set is associated. The microprocessor 108 may retrieve these sequencer entry points and timer module data from system control data stored in firmware 112 and may write these data into input registers of the programmable sequencer logic 112 and programmable timer module 110. Alternatively in some straightforward systems, the programmable timer and sequencer may be implemented as software routines with output results stored in microprocessor registers which are written out to simple external hardware latches connected to signal light power supply and switches circuitry (124) at the expense of some performance and functionality.

Prior neural network architectures provide parallel vector input; polling methods to identify next available, or ready-to-learn, neurons; and signal propagation between neurons are all useful in the present innovations in a given hierarchical layer. Early implementations may use combinations of smaller neural network arrays to achieve the minimum required hierarchy levels and sizes, but such approaches cannot have the upgrade flexibility of a very large neuron array which is infinitely reconfigurable via programmable logic, such as with the systems and methods herein. Direct programmable interconnect(s) consistent with the present innovations may improve performance by enabling all network hierarchical levels to operate in parallel.

Local inputs include sensor arrays 140, which may include various newer types of sensors, at the traffic light providing the traffic signal light point of view, pre-existing inputs, such as pedestrian crosswalk buttons and weight- or inductive loop vehicle sensors 142, and/or other data capture devices providing different perspectives, such as an offset video camera 144 which may also serve as a traffic violation recording device.

The local I/O module 104 may be configured to handle both digital and analog signals and has sufficient spare channels which may be assigned to future devices to support the desired upgradability. Some of these channels are bidirectional so that control commands can be sent back to specific devices such as a video recording module.

The system bus 116 is bidirectional by definition, and, as shown in FIG. 1, may interconnect the microprocessor 108 and digital memory (112, 114) with the communication interface 132, the programmable interconnect logic 130, the neuron classifier logic outputs 118, programmable timer module 120, and the programmable sequencer logic 122. In some embodiments, one or more of the neural network(s) and components 118/124/134/130 may be implemented as SSD.

The programmable interconnect logic 130 may be configured to allocate the required number of neurons to each of two or more hierarchical levels and to configure the interconnections between them. The programmability allows subsequent upgrade to reconfigure the neuron allocations and hierarchy as improved traffic control methods are developed without requiring hardware changes. Another function that may be programmed into the programmable interconnect logic 130 is to gate which "matches" detected from the neural network array are gated to the microprocessor 108 for required action in changing traffic light sequence and timing.

Similarly, the programmable sequencer logic 122 may be configured at initial traffic light installation customized for traffic lane and signal light configurations specific to each orthogonal intersection approach. Example sequences are discussed in subsequent figures. Along with the sequences, default initial values for the programmable timer module parameters are configured upon initial signal light installation. This provides for "FailSafe" operation in case of sensor array device, microprocessor control, or neural network array function failure. Traffic lights consistent with the present innovations may continue to operate in the same fashion as many existing traffic signal lights according to the timings and signal light sequences of the default conditions programs into the programmable timer module 120 and programmable sequencer logic 122.

As noted previously regarding other features of the innovations here, the programmability of the neuron array interconnect logic, the timer module, and a sequencer logic provide upgradability without any hardware changes to the basic signal light controller.

Current and next state table of the programmable sequencer logic may be used to communicate status to similar adjacent traffic light controllers 150 for traffic flow optimization as described in the present innovations or to communicate with incoming traffic object vehicles interactively.

The communication interface module 132 may be configurable to provide varied functionality. It may provide an interface for all remote inputs and outputs. For example, as described previously, the current state and status of traffic objects and groups of traffic objects of nearby similar traffic light controllers 150 can be used to optimize traffic flow control at this particular traffic signal light. Likewise, the output of current state information of both the signal light sequencer and higher-level group traffic object position and velocity status information is useful to similar adjacent traffic light controllers for optimization traffic control at each traffic signal light location. Therefore, each traffic light controller operates in completely autonomous fashion while being coordinated with other similar controllers in the larger traffic control network system. Instead of fixed signal control coordination across the array of traffic control network signal lights, each traffic signal light controller may be configured with components for receiving and processing information regarding awareness of the multiplicity of local and nearby traffic flow status and for making optimal, autonomous decisions for traffic control signaling for the specific site.

The communication interface module 132 may be arranged as the conduit to a remote command center 152 for effecting local system upgrades or system-wide control of the local site. In some implementations, central traffic flow control algorithms may indicate optimal system-wide traffic control requires forcing of local traffic light sequences into particular states. Thus, this communication interface from the central network wide command center allows preemption of local system by central command. Normal autonomous operation may be optimized by initial set up and periodic updates, as required, from the remote command center 152. These may include changes to configurations of sensors to specific neurons via retraining or training of new neurons in the lowest hierarchical levels; changes to configurations of neuron to neuron connections via updates to the programmable interconnect logic 130; the download of updated, externally acquired training into RAM 114 to be programmed directly into specific neurons 128; the download of new training algorithms to system firmware 112; the initiation of training sessions at this specific intersection using downloaded training algorithms; and/or changes to sequences and timing sets written into the programmable sequencer logic 122 and the firmware 112 control data for the programmable timer module 120, among other things.

An external radio antenna array may be included, and may be designed to capture frequencies specific to all relevant communication protocols that may be needed by the controller, including broadband datacom (e.g. WiFi) and frequencies used for standardized ERV and HOV communication. Similarly, the system's communication interface module may include digital logic for required standardized datacom interfaces such as WiFi. The present systems may also be configured to free up the microprocessor from the task of monitoring specialized signals. As mentioned previously, one set of system clock timing may be used to synchronize data capture from the radio antenna arrays with the timings of specialized signals such as ERV and HOV requests. The data may be fed directly into higher level than neurons trained to detect the unique sequence of signal preemption requests transmitted by ERVs or HOVs. Recognition of such a unique signal by neural network may generate a unique interrupt request to the microprocessor, which then begins any required authentication process for validating and executing the preemption request. Similarly, any combination of sensory input the neural network is trained to recognize can be used to generate interrupts triggering specialized control sequences supervised by the microprocessor 108.

The local nonvolatile digital memory 112 of the system may store training algorithm software for optimization of the neural network learning. As previously noted, the communications interface 132 may relay commands from a remote command center to enable continued learning or re-optimization of traffic flow decision-making as required by changes in local traffic flow conditions. Through the same interface, improved training algorithm may be downloaded at any time to be nonvolatile digital memory 112. Further, the training itself, acquired through simulation by similar controllers at remote sites, can be downloaded via the microprocessor 108 directly to the neural network array in the form of specific analog weightings of specific neurons in the local array. Similarly, traffic flow control decisions learned at remote simulation sites may be downloaded as analog weightings of the appropriate neurons in higher levels of the neural network array hierarchy. As such, systems and methods herein may be upgraded at any point in time based on new learning acquired at the local site or learning which is uploaded from remote location training without hardware changes to the local controller.

The basic firmware executed by the microprocessor 108 may initiate default traffic light control sequences programmed into the programmable sequencer 122 to provide failsafe operation in the case of sensory array or neural network control failure. Pre-existing sensors, such as conventional vehicle sensors (e.g., inductive/loop sensors, weight sensors, etc.), could even be monitored by the microprocessor in the event of such failures such that operation identical to that of current, conventional traffic lights may be effected in FailSafe mode. Such Fail Safe mode(s) may also used for basic startup operation or whenever no traffic activity is detected.

FIG. 2 shows a typical traffic light configuration for a common two-lane highway with a dedicated left turn lane with a traffic sensor array 202 as may be used consistent with the present innovations. The conventional traffic signal light 204 in this case, as shown, has the standardized red, yellow, and green signal lights with the green left turn indicator below. Other conventional components are weight- or inductive loop vehicle sensors 206 and mechanical switches 208 at the light pole for pedestrian crossing. Weight sensors could be physical weight measurement devices but most common conventional implementations are "inductive loops" with simple threshold detection of traffic objects containing ferro-magnetic materials being sensed "digitally", i.e. as being present or absent. These are often miscalibrated so that some traffic objects are missed and obviously cannot detect traffic lacking conductive (e.g. ferrous) materials. If the analog values of inductance are sensed directly and presented as a range of values, the inductance may provide an alternative means of sensing weight as approximated by the amount of conductive material detected at the sensor. Other symbols included in the drawing are for conceptual understanding only, as opposed to providing detailed mechanical representations. Video cameras on both left 210 and right 212 extremes of the horizontal suspension arm may be included and may provide ideal parallax video input for recognition of traffic object position and distance. Alternatively, a single frontal video camera may be sufficient for most purposes. Another camera labeled "top view video" 214 can provide additional data input for recognizing pedestrian and/or potential traffic light violators. With sufficiently wide angle, such a camera could capture pedestrian traffic for all directions and possibly obviate the need for other video cameras. As described previously, a radio antenna array 204 is included to capture all standardized datacom and specialized radio signal capture and transmission to and from the traffic light. As an alternative to radio signaling for specialized preemptive signal control, specific audio patterns such as sirens from ERV's can be sensed as an additional data type recognizable by neural network, as represented by the symbol for an audio sensor 216 in FIG. 2. The present systems may be designed with sufficient spare neuron capacity to accommodate additional sensory input from various sources as represented by another FIG. 2. symbol indicating capture of infrared [IR] or other electromagnetic spectra 218. The capture of additional spectra may be useful for detecting higher-level traffic characteristics such as estimating the number of passengers in any given vehicle. Similarly, the deployment of a radar unit 220 which can provide proven vehicle distance and velocity data may be desired, though it should be noted, as described elsewhere, that this added cost of a radar unit may be obviated by the combination simpler sensory input and higher-level neural network recognition of relative vehicle position and velocity. Aside from speed and distance calculations, the radar unit may be useful for improved traffic object classification. Along with IR or other spectra sensor input, unique radar signatures returned by incoming traffic objects may be useful to classify them in dark or bad weather conditions. Multiple neurons may be assigned to each unique "match" for a traffic object class recognized by different sensors in different conditions. Thorough experimentation will yield the optimal configuration of sensor arrays and neural network capacity in regards to performance versus cost for any given traffic control environment.

Another symbol in FIG. 2 indicates a rearview video camera location 222. This is commonly used for additional data capture for the purposes of traffic light violation detection and recording, as described in prior art. Another purpose for such a video camera installation is to handle the case where visibility of the local traffic light area is obstructed by raised road surface areas or other physical barriers. In these cases, improved sensory input to the traffic light controller yields greater traffic flow performance at lower cost than conventional sensors such as roadway-embedded inductive sensors.

Of interest to certain aspects of the present innovations may be utilization of any and all video capture devices being superior in many cases to conventional roadway-embedded inductive sensors 206. This advantage is obvious to motorcyclists and bicyclists, since conventional sensors often fail to detect their presence. The current innovations are far superior in such regard. Neural network recognition of learned video imagery for motorcyclists and bicyclists provide traffic control system high confidence recognition of these traffic light users. While contemporary thinking may continue to assign lowest priority to this type of traffic, the ongoing efforts to improve overall fuel economy will motivate the desire to provide most efficient traffic control for this type of traffic. Superior, expanded traffic object recognition of the present systems and methods maximizes traffic intersection throughput and minimizes traffic stoppage of all traffic objects including those which are those which are not detected by conventional sensors.

FIG. 3 shows another typical traffic light configuration 302 more common in urban areas having two or more traffic lanes in each direction and dedicated left turn lanes. The dedicated left turn lane signal light 304 commonly includes only left turn arrows in the same red yellow and green colors and orientation as the standard signal lights placed over the through-going [straight] lanes (306, 308), hence providing traffic control commands specific to the left turn lane traffic. As shown in FIG. 3, prior conventional traffic intersections are equipped with weight- or inductive loop sensors embedded in the roadways at significant initial cost, not to mention substantial ongoing costs required to modify or repair such sensors. Basic traffic flow prediction capability is provided by placement of additional such sensors offset at a distance from the traffic lights sufficient to trigger a signal light sequence change to accommodate incoming traffic. Several of the newer traffic sensors described previously can be installed at the intersection at costs far lower than those incurred when roadway reconstruction is required as with prior art.

This figure also illustrates the superiority of aspects of the present innovations as shown by a Vehicle 320 in the center through-going lane with its left turn signal lights flashing. Having already triggered the most distant offset inductive sensor 310, the vehicle will have initiated the changing of traffic light states to the color green, allowing traffic to pass through the intersection, in both through-going directions of the vehicle whenever no competing traffic from the orthogonal directions is detected on the assumption that Vehicle 320 will proceed straight through the intersection over straight lane inductive sensor 312. In current systems, it is not until Vehicle 320 crosses left turn lane sensor 310 that the driver's intention to turn left is detected. This standard traffic flow decision of the prior art is the wrong decision in this case. Full compliance with this driver's intentions requires the recognition of the driver's signal for making a left turn, the initiation of a lighting subsequence with a green left turn arrow combined with red [stop] light indications for through-going traffic in the other three directions or an equally-safe subsequence indicating left turns allowed in Vehicle's lane and its counterpart left turn lane directly opposite. The present innovations may accommodate traffic light sequence initiation and higher-level neural network recognition of such drivers' intentions for making optimal traffic flow decisions in such cases by having turn signal indications incorporated in the set traffic objects stored in lower-level neuron object recognition. An added benefit of this traffic signal control capability is training the general public to use their vehicle turn signal indicator lights to signal their intentions to both the traffic control system and their fellow drivers. While the intention of placement of distant sensors (316, 318) is to change the traffic light state in advance of incoming traffic, the wrong decision can be made without neural network recognition of driver intention. Due to real-time recognition and decision-making, the neural network selects the optimal traffic flow control decision immediately after Vehicle's state is recognized as having a left turn indicator light flashing.

FIG. 4 shows one of several traffic lights sequences as may be programmed into the programmable sequencer logic of traffic light controller, and describing a sequence common to a straightforward, single through-traffic lane intersection also having a dedicated left turn lane shown previously in the FIG. 2. A value of "1" indicates the "ON" state for the traffic light lens indicated in the left-hand column, wherein the left turn arrow [Red-, Yellow-, Green-LT] may in fact be different states of the left turn arrow lens occupying the fourth, or lowest, position of a single traffic light as shown previously in FIG. 2.

The sequence set forth in FIG. 4 describes one beginning with left turn traffic from both opposing directions is allowed first, followed by through-going [straight] traffic in those same directions while traffic in the orthogonal directions is stopped. It should be viewed as two separate sequences which might be labeled "both left" followed by "both straight." States 1 and 10 can be described as the "ALL STOP" state which, in some implementations, is a base state from which any alternative light sequence can be initiated. The programmable traffic light sequencer may store all useful sequences needed for any particular traffic light and direction combination. Examples of other sequences for this same intersection's traffic for this direction include: a) swapping these subsequences to allow "both straight" followed by "both left," b) single left turn and through-traffic from one direction followed by "both straight," possibly followed by single left turn and through-traffic from the other direction, or c) subsets of these, all of which are deployed in prior conventional traffic light control systems. The previously mentioned "FailSafe" mode may use a complete set of sub-sequences insuring that all traffic lanes from all directions are given the minimum specified green light time. Some time interval is programmed for the "ALL STOP" state as a boundary between all programmed subsequences so that any subsequence can be selected after any other and so that the light can be held in the "ALL STOP" in an emergency.

An advantage consistent with one or more aspects of the innovations herein is the ability to learn and recognize an exhaustive set of traffic flow patterns from all directions converging on the intersection and to learn the optimal traffic flow decisions for each case through the use of specific neural network training yielding optimal traffic flow results, such as minimal vehicle wait times, maximum vehicle throughput, maximum passenger-weighted throughput, or vehicle tonnage throughput. Unique traffic pattern recognition trained to higher-level layers of the neural network produces unique output which the system uses to select sequences and programmable timer base values which microprocessor loads into sequencer and timer.

FIG. 5 shows another set of traffic lights sequences typical in multi-lane intersections as depicted in FIG. 3. Here, states #1 and #12 are the base "ALL STOP" states, and sequences might be labeled "single left and straight" followed by "opposite left and straight," with state #13 indicating the beginning of a third subsequence, a "left and straight" flow command from one of the two adjacent orthogonal directions. These are by no means exhaustive set of subsequences and are included only for the purposes of illustration and to show salient sequences for particular traffic lane and light situations. They also illustrate that any subsequence can be selected from the base "ALL STOP" state, yielding the ability to initiate overall sequences for all signal lights facing each direction in an intersection for optimal overall traffic flow. State #3 shows a blinking green left turn arrow preceding the yellow "caution" state of that arrow lens for providing next state warning to drivers in that left turn lane as has been described in prior art. Similarly, state #7 shows the round green lens of the through traffic lanes in that same direction also blinking prior to the change to the yellow "caution" state. The current innovations may provide an additional level of safety through the training of higher-level neurons for speed and distance recognition whereby programmable timer values can be updated in real time to modify signal light timing for collision avoidance. The same prediction can be used for traffic light violation detection and reporting. Both collision avoidance and traffic violation detection have been described in prior art, but implementations of the current innovations are unique in deploying high-capacity neural networks for such detection and minimal chip solid-state implementations, improving performance over prior digital computational methods.

FIG. 6 lists examples of neural network training data as a function of four hierarchical neuron layers, according to illustrative systems and methods. This is by no means a specific detailed implementation; rather, it serves as an example for illustration and discussion purposes only. Detailed characteristics of sensor array data collection and neural network recognition capabilities are required to define an efficient and optimal configuration. In systems so equipped, a neural network of very large size may store enough individual vehicle image vectors to allow exact match [Match 1] recognition of a very high percentage of vehicles currently using the roadways. More common and sufficiently useful for this application is classification of vehicles commonly used in the automotive industry such as sedan, truck, or SUV. Detailed classification of specific types of vehicles such as hybrid or electric vehicles [EV's] may be useful for traffic control decision-making in higher neural network hierarchical levels. Similarly, high confidence recognition of motorcycles and bicycles is attained through training of Layer 1 neurons. The present innovations are far superior in that regard, allowing all such high-efficiency methods of transportation to influence traffic flow decision-making. As discussed previously, audio or frequency specific radio signals can be input and recognized by layer 1 neurons to initiate priority override traffic light sequences for ERV's or HOV's. Multiple Layer 1 neurons can be employed to recognize the relative position of each incoming traffic object along with the recognition of the object itself or in conjunction with other neurons trained to identify specific traffic object types.

For the purposes of distance and position recognition of multiple traffic object types, the neuron training may have several distinct fields within a video sensor where different neurons are trained to recognize any number of traffic object classes in these specific locations. These neurons are assigned to the same context, forming a "recognition engine" for recognizing that particular object class, in this case position and distance. Video data streams from right and left, or stereo, cameras as shown in FIG. 2 may be particularly useful for position and distance recognition.

Other neuron groups are assigned to other recognition engines, or contexts, and specific categories within contexts for detailed traffic object recognition. It may be useful to separate significantly different traffic object types, such as private vehicles, commercial vehicles, and bicycles into separate recognition engines or contexts since this may facilitate higher-level traffic flow decision prioritization. Due to the size of relative video input fields, it may be useful to assign unique neurons to various groups sizes of small traffic objects such as bicycles. For example, the network may be trained to recognize three bicycle group objects: a solo cyclist, two new cyclists, or a group of three or more. This may be the optimal method for recognizing cyclists, all within the Layer 1 hierarchy, as opposed to aggregating traffic object groups in higher neural network layers as in the case of larger traffic objects. This illustrates the experimentation and judgment required for-assigning neurons to specific recognition tasks.

For a given recognition context and traffic object category, the control system may input various types of sensory input. For example, as previously mentioned, a radar array may provide unique traffic object signatures in addition to highly accurate position information. These radar data can be input as part of a large input vector to the neural network array in combination with video and other sensory input or they could be fed separately into other dedicated neurons of the same context and category, another illustration of how the system configuration may vary with the chosen input sensor array or size of the neural network array. As noted previously, it may be useful to have separate contexts assigned to dedicated neuron groups for each incoming traffic direction.

Though a vehicle's position may be implicit in specific learned traffic object recognition neurons, separate neurons may be trained to recognize position independent of object class, i.e. are grouped in a specialized context for distance and position. These neurons may be trained to fire when any type of traffic object is recognized as entering specific zones approaching the traffic light. By accumulating position data, higher level neurons can be trained to recognize relative speed of approaching traffic to facilitate traffic flow decisions in time. Similarly, the position among multiple lanes is valuable for higher level decision-making. Additional sensor input may also allow recognition of vehicle occupancy. The recognition of platoon and high occupancy state of incoming traffic could be used to prioritize and optimize traffic flow throughput on the basis of passengers instead of just the vehicles. Other neurons could be trained to recognize active states of vehicle turn signals which, as described earlier, can improve traffic flow through better understanding of the driver's intention.

Layer 2 neuron training in this example generally involves recognition of multiple traffic objects' characteristics or their relationships with the traffic intersection and nearby vehicles. Research has shown that overall traffic flow is improved when vehicles are grouped into "platoons," and prior art has described specialized traffic signal controllers which force platoon formation and regulate traffic flow accordingly. The present innovations are superior in this regard since Layer 2 recognition automatically detects spontaneously formed platoons which can be given traffic signal priority. Similarly, recognition of vehicle group characteristics from nearby intersections can be used to optimize traffic flow decision-making over a wider area. Sequences of traffic recognized in Layer-I can be accumulated over multiple system clock cycles to generate recognition of traffic object wait times and relative distance and velocity of incoming traffic. Top cameras can observe pedestrian traffic and adjust signal timing as described in prior art when speed and position of individual pedestrians are recognized as placing them in danger. As mentioned previously, recognition of groups of traffic objects may also be transmitted to nearby similar controllers to optimize traffic flow over a larger area. Unique advantages of aspects of the present innovations may involve having all similar controllers operating autonomously without complex, inefficient fixed timings and sequences or centralized control while still utilizing information from a wider traffic area.

Examples of layer 3 recognition include higher-level patterns such as average speeds of multiple incoming traffic objects, aggregate wait times, or cumulative passenger occupancy. High-level inputs from sources such as a central network-wide control station may also be included. This is the highest recognition level in this example where combinations of various incoming traffic are recognized. High-level prioritization based on these aggregated traffic object recognitions can be incorporated into the training to regulate traffic flow from all directions.

Further, according to this illustrative implementation, layer 4 neurons may be trained to recognize optimal traffic flow decisions based upon input from all lower hierarchical layers. Programmable interconnect logic 130 may route data from the configurable I/O from specific neurons to specific layer for neurons. Current state information of the programmable sequencer 122 and timer module 120 may also provide critical input for Layer 4 neurons deployed to detect potential traffic violators or traffic collisions. Training algorithms for Layer 4 neurons may seek optimum traffic flow decisions yielding minimum wait times for all traffic objects and maximum overall traffic throughput. One or more Layer 4 neurons is/are trained for each subsequence programmed into the sequencer. Similarly, each subsequence may have two or more timing sets, each of which has one or more Layer 4 neurons trained to recognize the optimal timing decisions, including a timing hold in the "ALL STOP" state when traffic light violators are detected and this decision can prevent a traffic collision. The microprocessor 108 loads the appropriate command for a specific traffic light subsequence and values for the programmable timer assigned to a particular Layer 4 neuron, effecting the optimal traffic flow decision As mentioned previously, the training could force traffic flow decisions which optimize passenger throughput of the intersection as may be preferable in many urban environments. Alternatively, the training might force decision-making which optimizes fuel economy as may be preferable in industrial zones. For example, large tractor-trailer rigs with the driver being the sole passenger may be given priority through some intersections to avoid fuel wasting stoppages. Ironically, the more efficient modes of transportation such as bicycles, motorcycles, hybrids, EV's, or even HOV's may be stopped to facilitate higher throughput of higher gross weight vehicle traffic in such a zone. Thus, the high-level traffic flow decision training is specific to each autonomous traffic light controller. The training can be updated whenever additional sensory input or vehicle classes are added to the system or when traffic flow priorities are changed. The traffic light controller thereby adapts to the needs of the local traffic area over time without requiring hardware modifications to the controller itself.

Further, in other implementations, the training (training algorithms) may force decision-making which optimizes traffic flow in a particular direction. For example, the training may operate as a function of a specific timing regime, such as a timing regime that alters weighting/operation as a function of a conservative timing regime and/or an aggressive timing regime. Further, an intersection may have a timing regime that is conservative in one or more directions or lanes and aggressive in others.

FIG. 7 summarizes an illustrative process flow for initial system configuration in stepwise fashion, consistent with one or more aspects of the innovations herein. Referring to FIG. 7, a representative four-step process is depicted including various optional aspects, though no process decision branching is shown. FIG. 7 includes various main elements shown on the left side which may be achieved in a number of ways, while other, more optional elements, shown within dashed-line boxes on the right side, represent detailed steps according to various implementations, using hardware and software available in the timeframe of the disclosure of the present invention.

According to the exemplary implementation of FIG. 7, an initial step may include processing system architecture information, 702. Desired outputs or results of such processing, which may comprise various manual and/or computerized information analysis, may include having working definition(s) of a traffic intersection signal light and sensor hardware and/or a general plan for neural network array implementation to enable system architecture configuration, at 704. Further, in some implementations, these parameters may be modeled outside the ambit of the present innovations, with definition(s) of system architecture being delivered in some standardized format, hence such processing of system architecture information is shown as being optional. Detailed steps of this process flow these are shown on the right, starting with definition of traffic light sequences and associated timer values for this specific traffic light configuration. Next is clear characterization and assignment of sensor array devices, wherein capabilities of sensing devices are quantified and mapped to recognition contexts and categories for which the neural network will be trained. Details and categories for recognize traffic objects are constrained by the size of the neural network implementation and may include any or all of previously described characteristics, including details of traffic objects that may influence prioritization such as HOV or ERV designation. In addition to recognition of individual traffic objects and their associated classes, other neuron groups may be assigned to detect distance and position relative to the intersection. Still other neurons may be assigned to recognize custom HOV/ERV priority inputs.

Higher-level neuron layers are trained to detect traffic object status such as vehicle grouping and speed. This requires concurrent definition of interconnections between hierarchical neuron layers. For example, the detection of traffic objects and specific distance/position zones may be aggregated over successive neural network recognition cycles for recognition of individual or group traffic object speeds and wait times for stopped traffic objects. Information developed as a function of the number of cycles required for a change in position of traffic objects or groups may be provided as input to neural network recognition engines for these traffic object state classifications. Different neurons configured to aggregate lower-level recognitions over varying ranges of recognition cycles yield recognition of different categories of traffic object speeds and wait times.

Highest level neuron layers may be configured to recognize input vectors from lower layers, resulting in classification outputs representing specific traffic flow decisions. The number of these neurons allocated to these tasks may be assigned as a function of the number of traffic light sequences and related timings required for specific hardware configuration of the traffic signal light.

A final aspect of processing system architecture information 702 may involve allocating sets of reserve neurons which can be used to enable additions or upgrades to system hardware or for retraining sets of neurons during real-time operation of the traffic light controller using current neural network training sets.

The illustrative step of configuring system architecture, 704, may be implemented in a number of ways, including configurations involving a hardware system containing system software and logic configurations and mask-programmable logic devices. One exemplary implementation shown on the right involves writing such configuration into programmable hardware as in the preferred embodiment of the present invention. System firmware may be downloaded into nonvolatile memory and programmable logic such as that used for the programmable sequencer, the configurable I/O, the programmable interconnect logic, the DSP configuration, the system clock controller, and/or the communications interface module. Decoding specific standardized communication interfaces or custom ERV/HOV signals may be achieved by microprocessor executed firmware or programmable logic within the communications interface module.

Processes of neural network training, 706, may be achieved by downloading externally acquired training, or on site learning required by specific local system, or a combination of the two. Real-time neural network training required on-site may involve successive training of a number of neurons until each targeted traffic object, traffic object state, and optimal decision is recognized with sufficient distinction from alternative classifications. The training process may be iterated, i.e. performed until all targeted recognitions of required elements is achieved and all counter examples are rejected. In some implementations, when a training set is presumed to be complete, the system may be validated by running the traffic light controller in "FailSafe" mode while collecting data on the autonomous decision-making of the highest level neuron layer. These results may be compared with the "correct" training examples, and the training may be repeated until these data match.

After neural network training, an autonomous operation startup process may be performed, 708. Various optional steps that may be performed in such process may include initially checking one or more of the proper function of sensor arrays, the communication module, the basic signal light sequencer and/or the timer function. Next, the system may be restarted in "FailSafe" mode, e.g. for some predetermined startup time, after which autonomous traffic decision flow control determined by the neural network may be enabled.

Overall exemplary system architecture, here, may first define a complete set of light sequences and timer module data sets specific to the traffic light configuration. Next a complete training data set of all input from the sensor arrays may be captured and stored. The contexts and category labeling for each traffic object class, traffic groups, position and distance zones must be defined, followed by definitions for traffic flow state recognition such as incoming traffic speed and individual and cumulative wait times for stopped traffic. Where the output of lower level neurons provides input to higher-level neurons, the required I/O configurations may be programmed into the programmable I/O PLA as too may the associated inter-layer connections between neurons hierarchical levels be programmed into the programmable interconnect logic PLA. The highest neural network layer may have one or more neurons assigned to each traffic flow decision represented by the matrix of each programmable sequencer entry point and associated programmable timer data sets. The number of neurons required for each traffic object, traffic state, and traffic flow decision may be allocated within each neural network layer, along with a number of reserved neurons for all recognition or decision processes selected for real-time training during normal live operation. Further, DSP modules may be configured to convert incoming data streams to match the neural network input vector size. The communication module may be configured for standard network communication protocols and/or for detection of specific high-priority ERV or HOV signals. In certain implementations, the PLA of the clock generator may be programmed for each specialized timing signal, from the base processor and system bus clock rates to those for the neural network recognition engines, the programmable sequencer timing input, the DSPs, various timings of the communication module, and various data capture cycles of different traffic sensor devices.

Where the traffic intersection closely matches that of a known existing implementation, some or all of the neural network training data sets from such remote locations may be programmed directly into the neural network array. Otherwise, the neuron training may be accomplished at the specific intersection of the present traffic light control system. Again, once complete training of the entire neural network is accomplished, the traffic control system may begin operation in the default "FailSafe" mode while data is collected for traffic flow decisions indicated by the top-level neuron layer so that intended function may be validated. Following system validation, the traffic control system may be set to operate in full autonomous mode according to the neural network training.

FIG. 8 is a diagram of an illustrative process flow for neural network array training. The training data sets from the traffic sensor arrays may first undergo an initial layer training 802, wherein they are presented to the lowest layer neurons, which may be trained to recognize each defined traffic object, traffic object group, and/or position/distance zone. In a recognitions processing step 804, data that is not recognized or classified 806 may be returned for further processing, while recognized data 808 is passed through for secondary, handling 810 such as storage and processing associated with a recognition mode. The required number of neurons may be activated until the complete set of these recognitions is accomplished. It may be sufficient for most traffic flow decisions to have overlapping influence fields of various neurons which can yield Match 2, or uncertain, classifications, since the recognition of any traffic object, especially in the case of a solo traffic object, can still produce the correct traffic flow decision at the highest level. The accuracy of recognition is determined by number of available neurons relative to the number of example input vectors to be recognized.

After lowest layer neurons are trained, they are set to normal operational recognition mode (see 810) and presented with the same training data set they were trained with, while the next higher neuron level is put into training mode, referred to as intermediate layer training 812. The next level neurons are progressively activated and trained 814, 816 until the defined set of classifications for that level are learned 818. This process is iterated 820, 822, 824 for each intermediate layer when there is more than one such layer. After the last intermediate layer is processed 826, these layers are put into recognition mode for the training of the highest neuron layer 828 The same example inputs used to train the lower levels may be used again in training the highest layer, though in some implementations this training may be focused on the highest level traffic flow decisions. Such training components, such as training software, may use weightings teaching neurons to select light sequences and timings which maximize overall traffic throughput and minimize traffic object wait times, but may also use other considerations such as vehicle class or passenger occupancy to prioritize specific traffic objects as described previously. Further, observed data of actual vehicle wait times may be be monitored by the microprocessor and used to alter the training inputs on the training software on each pass until a minimum is reached for any given traffic pattern. The traffic light sequence and timing resulting in such optimal solution may be selected as the "correct" decision, and the location of the neuron trained to fire in a specific traffic situation may be the information decoded by the microprocessor to select that specific sequence and timing. One or more top layer neuron may be activated and trained 830 for each combination of programmable sequencer and programmable timer settings which represent traffic flow decisions. Here, for example, such training may entail processing, via an iterative/loop process 832, to provide a complete, unique decision set for each priority input and sequence/timing option. Finally, each training data set for every context, i.e. recognition engine, within each neural network hierarchical layer may be stored 836, such as in system firmware or in an off-line remote location, and final validation testing may be performed. Once this processing is complete, the data is available for subsequent system maintenance or for use in similar systems at other locations.

FIG. 9 is an illustrative software flowchart depicting exemplary system startup and operation features, consistent with one or more aspects of the innovations herein. In the exemplary diagram of FIG. 9, the system starts up in FailSafe mode 904 following initial power up and system bootstrapping 902. Neural network recognition 906 may be enabled following successful diagnostic testing of sensor arrays and the communication module. The programmable interconnect logic may be configured to route, at 908 and 916, only Match 1/2 flags from highest level traffic flow decision neurons to the microprocessor. Match 1, or identified, classifications are scanned first, beginning with highest priority decisions 908 such as those generated by ERV or HOV special signals or traffic flow direction from the remote command center. Of course, neurons assigned to the context for detection of potential collisions may be included among these highest priority Match 1 classifications to be monitored. Other Match 1 classifications are specific optimal traffic flow decisions which are initiated directly to the programmable sequencer and timer. When decisions are confirmed by the neurons 910, 920, the associated programmable sequencer and timer settings may be loaded 912, 922. The microprocessor may scan the flagged uncertain Match 2 classifications (918) next, at 926 and 928. Where two or more neurons indicate the same traffic flow decision 930, the associated programmable sequencer and timer settings are loaded 932. Otherwise 934, the microprocessor determines which decision is most compatible with the current traffic signal state and implements that decision 936, since the uncertain classification implies that either decision is acceptable. As with processing the certain Match 1 decisions 924, the control software may then branch back to scanning for new Match 1 decisions 906.

FIGS. 10A-10B are a diagram and a flowchart, respectively, of higher-level recognition processing as performed by a Neural Network, consistent with one or more aspects of the innovations herein. FIG. 10A is a diagram showing an exemplary traffic state near a traffic intersection which illustrates exemplary higher-level recognition aspects. FIG. 10B sets forth an illustrative, generalized process of such higher-level recognition processing. Referring to FIG. 10B, such generalized process may include obtaining positional data 1032 (e.g., obtaining positional information using low level neurons assigned to recognize objects as being present within defined zones), performing aggregation of this data 1034 (e.g., aggregating positional state information from low level neurons over multiple classification cycles by higher level neurons to recognize patterns or information, such as arrangements and/or relative speeds of traffic objects within monitored positional zones), and further processing the aggregated information over multiple classification cycles 1036 (e.g., aggregating multiple traffic pattern and/or relative velocity states from multiple intermediate level neurons over multiple classification cycles by highest level neurons to recognize global traffic state and/or associated optimal traffic flow decision(s)).

Turning back to the illustrative implementation of FIG. 10A, an alphanumeric array, 1002, represents positional zones described earlier in the vicinity of traffic signal light 1004. Traffic object group 1006 represents a self organized "platoon" of traffic objects, such as a convoy of cars or other vehicles. In this diagram, which shows one detailed example of the generalized process of FIG. 10B, specific lower-level neurons may be trained to recognize traffic objects as being present in each positional zone which are designated in this drawing by coordinates ranging from A1 through A6 to N1 through N4. The traffic platoon 1006 has traffic objects in zones N2, M1, L3, K1, and J2. While some lower-level neurons may be assigned to specific traffic object type recognition, other low-level neurons may be assigned to detect traffic objects of any type as being present in specific zones. Higher-level neurons aggregate the these recognitions into recognitions of traffic object groups and states. For example, the traffic object shown in zone N2 will be recognized over successive neural network classification cycles to have progressed through zones M2, L2, K2, J2, and so on, if it continues in a straight line. The number of recognition cycles consumed during this progression translates directly to vehicle speed. Aggregation of such progressions yields classification varying ranges of traffic objects speed. Further, specific neurons can be trained to recognize specific speed ranges, which, in turn, can provide input to even higher level neurons for traffic light flow decisions, collision avoidance, or traffic light violation prediction.

In some implementations, other sets of neurons can be trained to detect one or more sizes of traffic object platoons, which would be prioritized over single traffic objects when processed by higher-level neurons for traffic flow decisions. Similarly, other sets of neurons may be trained to recognize stopped traffic. For example, traffic groups 1008, 1010, and 1012 may be recognized as stopped traffic by higher-level neurons detecting traffic objects occupying the same position zone over one or more neural network classification cycles, wherein the total number of cycles is proportional to traffic object wait times. Different sets of neurons may be trained to recognize any important pattern, so in this example an additional set of neurons can be assigned to recognize cumulative wait times, the sum of stopped traffic objects multiplied by their stoppage times. A training input that may be important for the neural network is to minimize cumulative wait times, so a properly trained highest level set of traffic flow control neurons would recognize in this example that these groups should be prioritized in the order of 1008, followed by 1010, then 1012, based on the number of detected waiting traffic objects assuming similar average wait times. Individual traffic objects 1014, 1016, and 1018, may add weight to the prioritization of traffic flow from their respective directions, though neural network training algorithms consistent with the present disclosure may prioritize these at a lower level for two reasons: 1) individual traffic objects have less weight than traffic object groups, and 2) these three traffic objects are all in right-hand lanes which may possibly pass through the intersection with right-hand turns that do not require changes to the traffic signal light. Traffic objects 1020 and 1022 may, in general, be irrelevant to traffic flow decisions. In fact, some implementations may ignore all traffic object position zones for traffic lanes exiting the intersection, including zones N3-N4 to 13-14 and A5-6 to 05-6 in this example. The capabilities of any implementation may be determined as a function of the size of the neural network implementation. So, for example, these same zones which may be excluded for a very wide range of traffic scenarios could prove useful for detecting dangerous "outlier" circumstances such as a vehicle approaching the intersection in the opposite direction of the legal convention.

Further, according to some implementations, the highest level neural network layer interpreting the data recognized by the lower-level neuron layers, here, would recognize a specific traffic flow optimization decision. In such cases, the next traffic flow sequence selected from any compatible prior state or "All Stop" state would be a sequence allowing a left turn by traffic group 1008 and a green light for through traffic passage by traffic group 1006.

Additionally, the innovations herein may be achieved via implementations with differing or entirely different components, beyond the specific components and/or circuitry set forth above. With regard to such other components (e.g., circuitry, computing/processing components, etc.) and/or computer-readable media associated with or embodying the present innovations, for example, aspects of the innovations herein may be implemented consistent with numerous general purpose or special purpose computing systems or configurations. Various exemplary computing systems, environments, and/or configurations that may be suitable for use with the innovations herein may include, but are not limited to, various clock-related circuitry, such as that within personal computers, servers or server computing devices such as routing/connectivity components, hand-held or laptop devices, multiprocessor systems, microprocessor-based systems, set top boxes, smart phones, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular control, delay or instructions. The inventions may also be practiced in the context of distributed circuit settings where circuitry is connected via communication buses, circuitry or links. In distributed settings, control/instructions may occur from both local and remote computer storage media including memory storage devices.

Innovative circuitry and components herein may also include and/or utilize one or more type of computer readable media. Computer readable media can be various media that is resident on, associable with, or can be accessed by such circuits and/or computing components. By way of example, and not limitation, computer readable media may comprise computer storage media and communication media in tangible format(s), though does not encompass transitory media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein in tangible (non-transitory) forms. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features consistent with the present inventions may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the present innovations or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the innovations herein, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not encompass transitory media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the present innovations have been specifically described herein, it will be apparent to those skilled in the art to which the inventions pertain that variations and modifications of the various implementations shown and described herein may be made without departing from the spirit and scope of the inventions herein. Accordingly, it is intended that the inventions be limited only to the extent required by the appended claims and the applicable rules of law.

The invention claimed is:
1. A system comprising:
a traffic light controller that implements traffic control using at least one processor;
non-transitory computer readable media having instructions stored thereon for implementing a neural network array, wherein the computer-readable instructions, upon execution by the at least one processor, cause the at least one processor to perform one or more operations;
memory storage coupled to one or both of the traffic light controller and/or the neural network subsystem;
communication input circuitry and/or communication output circuitry coupled to one or both of the traffic light controller and/or the neural network subsystem; and
a plurality of sensor inputs provided to the system;
wherein the system includes additional headroom to expand and/or upgrade the traffic light controller via addition of additional inputs, traffic object(s) neural network recognition training information and/or subcomponents, and/or control decision training information and/or subcomponents;
wherein the one or more operations include:
performing recognition of the traffic types using the neural network array having a plurality of sensor inputs from video sensors, physical sensors in infrastructure of the traffic light system, and other sensor inputs from one or more electromagnetic sensors; and
wherein the other sensor inputs include an infrared traffic input providing detection capability of vehicle type and passenger quantity from transmission of various electromagnetic spectra data types.

2. A system comprising:
a traffic light controller that implements traffic control using at least one processor;
non-transitory computer readable media having instructions stored thereon for implementing a neural network array, wherein the computer-readable instructions, upon execution by the at least one processor, cause the at least one processor to perform one or more operations;
memory storage coupled to one or both of the traffic light controller and/or the neural network subsystem;
communication input circuitry and/or communication output circuitry coupled to one or both of the traffic light controller and/or the neural network subsystem; and
a plurality of sensor inputs provided to the system;
wherein the system includes additional headroom to expand and/or upgrade the traffic light controller via addition of additional inputs, traffic object(s) neural network recognition training information and/or subcomponents, and/or control decision training information and/or subcomponents; and
wherein the one or more operations include:
utilizing higher levels of neural network recognition hierarchy to prioritize passage through the intersection on the basis of one or more of vehicle priority, passenger occupancy, vehicle size, and/or vehicle weight.

3. A system comprising:
a traffic light controller that implements traffic control using at least one processor;
non-transitory computer readable media having instructions stored thereon for implementing a neural array, wherein the computer-readable instructions, upon execution by the at least one processor, cause the at least one processor to:

receive data regarding travel of traffic objects associated with an intersection;

use a neural network to recognize traffic types associated with the intersection, the traffic types being composed of one or both of traffic context types and traffic category types;

use the neural network to recognize traffic states associated with the intersection;

use the neural network to process traffic flow decisions for the intersection as a function of prior traffic information regarding the intersection; and use the neural network to determine traffic flow for the intersection via recognition and use of the traffic flow decisions in providing an output that controls a traffic light system associated with the intersection;

wherein higher levels of neural network recognition hierarchy are used to determine relative traffic object and pedestrian positions and speeds, which is used to select optimal traffic light sequences using a sequence of neural network recognition cycles.

4. A system comprising:

at least one computer including at least one processor and non-transitory computer readable media;

wherein the computer readable media include instructions for implementing a neural network array associated with the at least one computer, wherein the instructions, upon execution by at least one processor, cause the at least one processor to:

receive data regarding travel of traffic objects associated with an intersection;

recognize, using the neural network array, traffic types, the traffic types being composed of one or both of traffic context types and traffic category types;

recognize, using the neural network array, states of the traffic;

memorize, using the neural network array, prior traffic flow decisions as a function of prior experience;

recognize and use, via the neural network array, the prior traffic flow decisions in providing an output that controls a traffic light system to achieve efficient traffic flow; and recognize the types of traffic using an array having one or more sensor inputs beyond inputs from video sensors and physical infrastructure including an infrared (IR) traffic input that provides:

infrared signatures of detected traffic objects independent from adverse weather or light conditions for recognition of vehicle position and type; and detection of vehicle passenger occupancy which is used in higher level traffic flow decision making; and giving priority based on passenger-weighted incoming traffic.

5. The system as in any one of claims 1, 2, 3, or 4, wherein the neural network subsystem comprises instructions, executed by the at least one processor for:

processing new sensory inputs; and retraining previously deployed neurons to take advantage of the new sensors;

wherein recognition of the traffic types is enhanced via adapting recognition by the previously deployed neurons to utilize the new inputs.

6. The system as in any one of claims 1, 2, 3, or 4 wherein the neural network subsystem comprises instructions, executed by the at least one processor for:

processing new sensory inputs; and utilizing additional, reserve neuron capacity that was initially included in the system, wherein the reserve neuron capacity is subsequently trained to utilize the new inputs.

7. The system as in any one of claims 1, 2, 3, or 4 wherein the neural network subsystem comprises instructions, executed by the at least one processor for:

utilizing 2 or more layers of neural network neuron storage elements for unique recognition, classification, and/or traffic flow decision-making tasks.

8. The system of claim 7, wherein the unique recognition, classification, and/or traffic flow decision-making tasks includes feeding information associated with the tasks from a low-level layer to higher level layers.

9. The system of claim 7, wherein the traffic flow decision-making includes state information inputs from nearby similar traffic controllers comparable with intermediate level traffic state recognition at the local controller which are combined at higher levels to optimize traffic flow decision-making at the local traffic signal light.

10. The system of any one of claims 1, 2, 3 or 4 wherein the instructions further cause the at least one processor to:

perform recognition of the traffic types using an array having a plurality of sensor inputs from video sensors, physical sensors in infrastructure of the traffic light system, and other sensor inputs from one or more electromagnetic sensors.

11. The system of claim 1, wherein the infrared traffic input comprises:

infrared signatures of detected traffic objects independent from adverse weather or light conditions for recognition of vehicle position and vehicle type; and detection of vehicle passenger occupancy which is used in higher level traffic flow decision-making; and wherein the neural network subsystem further comprises instructions, executed by the at least one processor for:

giving priority to passenger-weighted incoming traffic.

12. The system of any one of claims 1, 2, 3 or 4 wherein the instructions further cause the at least one processor to:

process new sensory inputs to the system from new sensors; and retrain previously deployed neurons to take advantage of the new sensors;

wherein recognition of the traffic types is performed via adapting recognition by the previously deployed neurons to utilize the new inputs.

13. The system of claim 3 wherein the instructions further cause the at least one processor to:

utilize 2 or more layers of neural network neuron storage elements for unique recognition, classification, and/or traffic flow decision making tasks including feeding information associated with the tasks from a low-level layer to higher level layers.

14. The system of any one of claims 1, 2, 3 or 4 wherein the instructions further cause the at least one processor to:

utilize 2 or more layers of neural network neuron storage elements for one or both of classification and/or traffic flow decision-making tasks.

15. The system of claim 3, wherein the code further comprises instructions, executed by the at least one processor for:

performing recognition of the traffic types using an array having a plurality of sensor inputs from video sensors, physical sensors in infrastructure of the traffic light system, and other sensor inputs from one or more electromagnetic sensors.

16. The system of claim 15, wherein the other sensor inputs include an infrared traffic input providing capability of detecting vehicle type and passenger quantity from transmission of electromagnetic spectra data types.

17. The system of claim 16, wherein the infrared traffic input comprises:
   infrared signatures of detected traffic objects independent from adverse weather or light conditions for recognition of vehicle position and vehicle type; and
   detection of vehicle passenger occupancy which is used in higher level traffic flow decision-making; and
   wherein the code further comprises instructions, executed by the at least one processor for:
   giving priority to passenger-weighted incoming traffic.

18. The system of claim 1 further comprising:
   one or more neural network arrays configured to absorb/perform functions of digital logic circuitry to configure, store, and/or change traffic light sequences and control decision with zero cost configuration change.

19. The system of claim 4, wherein the at least one computer is further configured for:
   providing additional headroom to expand and/or upgrade the system via addition of additional inputs, traffic object(s) recognition training information and/or subcomponents, and/or control decision training information and/or subcomponents.

20. The system of claim 4, wherein the at least one computer is further configured for:
   providing an additional safety for an intersection through training higher-level neurons, of the neural network array, for speed and/or distance recognition, wherein the speed and/or distance recognition is utilized to update signal light timing in real time for collision avoidance.

21. The system of any one of claims 1, 3 or 4, wherein the instructions further cause the at least one processor to:
   utilize higher levels of neural network recognition hierarchy to prioritize passage through the intersection on the basis of one or more of vehicle priority, passenger occupancy capacity, vehicle size, and/or vehicle weight.

22. The system of any one of claims 1, 2, 3 or 4, wherein the instructions further cause the at least one processor to:
   utilize 2 or more layers of neural network neuron storage elements for unique recognition, classification, and/or traffic flow decision making tasks wherein the unique recognition includes feeding from a low-level layer to higher level layers.

23. The system of any one of claims 1, 2, 3 or 4, wherein the instructions further cause the at least one processor to:
   process one or more electromagnetic sensor inputs to detect reduced traffic flow, wherein the system is configured to adapt to the reduced traffic flow; and
   incorporate the reduced traffic flow information into the higher level traffic flow control decision-making.

* * * * *